United States Patent [19]

Fujii et al.

[11] Patent Number: 4,740,437

[45] Date of Patent: Apr. 26, 1988

[54] ELECTROCHEMICAL BATTERY HAVING AN ELECTROLYTICALLY REDUCED PRODUCT OF A SACCHARIDE AS THE ELECTRODE MATERIAL

[75] Inventors: Masaki Fujii; Shiroh Gotoh; Tatsuo Wakayama, all of Yokkaichi, Japan

[73] Assignee: Mitsubishi Petrochemical Co., Ltd., Tokyo, Japan

[21] Appl. No.: 917,030

[22] Filed: Oct. 9, 1986

[30] Foreign Application Priority Data

Oct. 15, 1985 [JP] Japan .................. 60-229356

[51] Int. Cl.$^4$ .......................................... H01M 10/36
[52] U.S. Cl. ................................. 429/213; 252/182.1
[58] Field of Search ............... 429/213, 212, 215, 217, 429/218; 204/72, 73 R; 252/182.1

[56] References Cited

U.S. PATENT DOCUMENTS

| | | | |
|---|---|---|---|
| 3,682,704 | 8/1972 | Keefer | 429/19 |
| 4,091,181 | 5/1978 | Merritt, Jr. | 429/94 |
| 4,375,394 | 3/1983 | Devon | 204/79 |
| 4,380,578 | 4/1983 | Bahary | 429/206 |
| 4,521,450 | 6/1985 | Bjorklund et al. | 427/121 |
| 4,567,250 | 7/1984 | Naarmann et al. | 528/423 |

FOREIGN PATENT DOCUMENTS

| | | |
|---|---|---|
| 0101894 | 7/1983 | European Pat. Off. . |
| 0123827 | 3/1984 | European Pat. Off. . |
| 0152632 | 12/1984 | European Pat. Off. . |
| 58-89639 | 5/1983 | Japan . |
| 58-93176 | 6/1983 | Japan . |
| 59-57741 | 4/1984 | Japan . |
| 59-112584 | 6/1984 | Japan . |
| 59-149654 | 8/1984 | Japan . |
| 59-157974 | 9/1984 | Japan . |
| 59-168010 | 9/1984 | Japan . |
| 60-58430 | 4/1985 | Japan . |
| 60-146470 | 8/1985 | Japan . |

*Primary Examiner*—Anthony Skapars
*Attorney, Agent, or Firm*—Frishauf, Hotz, Goodman & Woodward

[57] ABSTRACT

Disclosed is an electrode using an electrolytically reduced product obtained by electrolytic reduction of a saccharide. According to the present invention, an electrode material of light weight having high energy density as well as high maximum output density, which can provide a non-pollutative battery can be obtained.

11 Claims, No Drawings

ELECTROCHEMICAL BATTERY HAVING AN ELECTROLYTICALLY REDUCED PRODUCT OF A SACCHARIDE AS THE ELECTRODE MATERIAL

BACKGROUND OF THE INVENTION

This invention relates to an electrode material, particularly an electrode material of light weight having high energy density as well as high maximum output density, which can provide a non-pollutative battery.

In recent years, with the progress of electronics, it has been earnestly desired to develop a battery of new type, which is light in weight and compact, having high electromotive force, high maximum output density and high energy density.

In the prior art, it has been reported to use a carbonaceous material for an electrode. For example, it is reported that, when Li metal is used for a negative electrode and graphite for a positive electrode, $BF_4^-$, $ClO_4^-$, $I^-$, etc. can be doped between the graphite layers by charging and dedoping can proceed by discharging, thus obtaining reversibility of charging-discharging. However, the increase of the anions electrochemically doped is limited by the material repellency of the anions doped between the layers, and also no great energy density can be expected, with the energy density being as low as aobut 100 wh/kg.

On the other hand, when graphite is used as the negative electrode, cations such as $Li^+$ ions can be doped between the layers, but they are very instalbe in an electrolyte and also react with the electrolyte, thus providing only an unsuitable electrode material (Surface 21 (1) 2 (1983); Electrochemistry 46, 438 (1978); Journal of Electrochemical Society, 125, 687 (1978)).

It is also reported to utilize active carbon fibers as the electrode material for both electrodes, but the electromotive force is as low as 1.2-2.9 V, the maximum output and energy densities are also small and self-discharging after charging is a problem (Japanese Unexamined Patent Publications Nos. 35881/1983 and 149654/1984).

There is also a report about use of a polymer sintered product comprising carbon as the main component obtained by heat calcination of a polymer as the electrode material for both electrodes. However, the electromotive force obtained is as low as 1.2-1.4 V, and the short circuit current is unsatisfactorily as small as 30 uA to 4 mA (Japanese Unexamined Patent Publication No. 93176/1983).

Further, there is also another report about use of an electroconductive polymer such as polyacetylene, poly-p-phenylene as the electrode material. When polyacetylene is used for both electrodes, the electromotive force is 2.5 V, the energy density 150 wh/kg and the maximum output density 17 K.W./kg. When Li metal is used for the negative electrode and a polymer electrode only for the positive electrode, the electromotive force is 3.5 V, the energy density 290 wh/kg and the maximum output density 35 K.W./kg. Thus, performances as a battery can be exhibited (Solid Physics 17(12), 753 (1982), Japanese Unexamined Patent Publication No. 112584/1984) However polyacetylene is unstable and very susceptible to oxidative deterioration. the result is a poor performance of the battery such as cycle life, etc. Also, since polyacetylene, poly-p-phenylene, etc. are insoluble and infusible, and therefore they can be worked with difficulty and cannot be formed into various forms of electrodes.

SUMMARY OF THE INVENTION

In view of the state of the art as described above, the present inventors have made intensive efforts to develop an excellent electrode on the basis of a recognition that it is important to have a good electrode material for positive electrode and negative electrode which is stable in doping and dedoping of ions and is also capable of being doped with a large amount of ions for development of a non-pollutative secondary battery of light weight having high energy density as well as high maximum output density. As a consequence, the present invention has been accomplished.

More specifically, the present invention uses an electrolytically reduced product of a saccharide as the electrode material.

DETAILED DESCRIPTION OF THE INVENTION

The present invention uses an electrolyticlly reduced product of a saccharide as the electrode material. This electrode material is used for the positive electrode and/or the negative electrode, and both electrodes are dipped in an electrolyte. Then, with application of a voltage from outside, the positive electrode is doped with anions and the negative electrode with cations, thereby generating an electromotive force, which is then connected to an external load to pass current by dedoping anions from the positive electrode and cations from the negative electrode. Thus, the present invention enables utilization of the doping-dedoping phenomenon as the charging-discharging process for a battery.

Also, in the case when employing a metallic single substance as the negative electrode, the present invention enables utilization of the doping-dedoping phenomenon of the electrolytically reduced product of a saccharide as the positive electrode for a battery. Particularly, the present reduced product exhibits its excellent characteristics when it is used as the negative electrode. In that case, a metal chalcogenide compound; a carbonaceous material; or known electroconductive polymers such as polyacetylene, poly-p-phenylene, polythiophene, polypyrrole, polyaniline, etc. can be used as the positive electrode material.

Here, the negative electrode refers to the electrode on the electrode side into which electrons are delivered by connecting to the cathode of an external power source during charging and in which cations are doped. In contrast, the positive electrode refers to the electrode on the electrode side from which the electrodes are withdrawn electron by connecting to the anode of an external power source during charging and in which anions are doped.

The saccharides in the present invention may be broadly classified into monosaccharides, disaccharides, trisaccharides and polysaccharides. These are classified according to the number of monosaccharides formed by hydrolysis of saccharides. To refer to the structural formula, they are polyoxyaldehydes, polyoxyketones or substances which will form at least one of both by hydrolysis.

Monosaccharides are polyoxyaldehydes or polyoxyketones represented by the formula $(CH_2O)_n$, and those naturally produced have $n=5$ to 7. For example, there may be included arabinose, xylose, lyxose, ribose (all are aldopentoses), ribulose, xylulose (all are ketopentoses), glucose, gulose, mannose, galactose, talose, altrose, idose (all are aldohexoses), fructose and sorbose (all are ketohexoses).

Disaccharides have a structure in which two monosaccharides are bonded in the glucoxide form. For example, there may be included sucrose, lactose, maltose and cellobiose.

Trisaccharides have a structure in which three monosaccharides are bonded in the glucoxide form. A typical example is raffinose.

Polysaccharides are polymers or macromolecules in which monosaccharides are bonded through glucoxide bonding in 4 or more units up to about 1000 units. Individual constituent saccharides are pentose in xylane, hexose in starch and a mixture of pentose and hexose in gums such as gum tragacanth. Examples of polysaccharides may include starch (starch is generally constituted of about 20% of the moiety dispersible in water called amylose and the portion substantially indispersible in water called amylopectin), dextrin (partially hydrolyzed product of starch), glycogen (contained in liver, etc. of human and animals) and inulin (contained in potatoes, etc.).

Also, cellulose (the main component of cell wall of vegetable) and hemicellulose (existing in sprout of vegetable, etc.) are particularly preferable polysaccharides.

In the present invention, cellulose is inclusive of its derivative in addition to typical cellulose, specifically carboxymethyl cellulose, hydroxyethyl cellulose, hydroxypropyl cellulose, methyl cellulose, ethyl cellulose, ethylhydroxyethyl cellulose, carboxymethylethyl cellulose, cellulose acetate, nitrocellulose, etc.

Among them, polysaccharides are preferred, particularly preferred is hemicellulose and celluloses, and most preferred is celluloses.

The electrolytically reduced product of saccharides can be prepared by, for example, reducing cathodically fine powder of cellulose in an electrolyte solvent in the presence of a suitable electroconductive salt to produce a black substance deposited on the negative electrode. In this case, the product is obtained in the state doped with the cations of the electrolyte.

The saccharides in the electrolyte solution may be applied with the reducing treatment in the form dissolved or dispersed in a medium or coated on a metal electrode plate for negative electrode (e.g. Pt, Ni, etc.).

Electrolytic reduction of saccharides is performed with a care so as to permit polymerization reaction to occur preferentially on the cathode, while suppressing precipitation on the anode, except for the case having a special purpose.

As such a method, there is the method in which a cathode chamber partitioned with a diaphragm by use of a microporous film such as a ultrafiltration film is formed and a saccharide is added in said cathode chamber. It is also desirable to use the method of selecting an electrolyte with low solubility of the saccharide to suppress its solubility, when employing a saccharide of high solubility. When the saccharide is colloidal or particulate, it is desirable to control the charges of the particles to become positive by addition of an electrolyte, surfactant, etc.

Also, the saccharide can be made like a paste or a gel, and coated or laminated on the cathode surface before carrying out cathodic reduction.

As the electrolyte solvent, known polar solvents conventionally used are available.

When employing an organic solvent miscible with water, a small amount of water, generally up to 10 wt. % of the organic solvent, may be added for enhancing electroconductivity. Advantageous electrolyte organic solvents may be, for example, alcohols, ethers such as 1,2-dimethoxyethane, dioxane, tetrahydrofuran and methyltetrahydrofuran, acetone, acetonitrile, dimethylformamide, dimethyl sulfoxide, methylene chloride, N-methylpyrrolidone and propylene carbonate, mixtures of these solvents, or ethylene glycol, propylene glycol or polyglycols such as polyethylene glycol, polypropylene glycol, polybutylene glycol or ethylene oxide/propylene oxide copolymers, etc., more advantageously those converted to complete polyethers by blocking of the terminal groups.

Also, the electrode material of the present invention can be prepared in an aqueous electrolyte system.

In preparation of the electrode material of the present invention, the electrolyte solution is imparted with electroconductivity and also an electroconductive salt is added for doping ions in the electrolyzed product.

As the electroconductive salt, known and conventionally used ionic or ionizable compounds can be used. Advantageous electroconductive salts contain as the cation alkali metal cations, particularly $Li^+$, $Na^+$ or $K^+$, $NO^+$, $NO_{2+}$ and $I_{3+}$ cation or particularly onium cations of nitrogen and phosphorus, for example, $R_4N^+$ and $R_4P^+$ type (wherein the groups R each independently represent a hydrogen atom, a lower alkyl group, advantageously one having 1 to 6 carbon atoms, an alicyclic group, advantageously one having 6 to 14 carbon atoms, or an aromatic group, advantageously one having 6 to 14 carbon atoms). Examples of the cations of this kind may include tetramethylammonium cation, tetraethylammonium cation, tri-n-butylammonium cation, tetra-n-butylammonium cation, triphenylphosphonium cation and tri-n-butylphosphonium cation. As the anion of the electroconductive salt, $BF_4^-$, $AsF_4^-$, $AsF_6^-$, $SbCl_6^-$, $PF_6^-$, $ClO_4^-$, $HSO_4^-$, $SO_4^{2-}$ and $I^-$ are particularly advantageous. Other preferable anions are anions of aromatic compounds having acidic groups. Examples of such anions may include $C_6H_5O^-$, $C_6H_5COO^-$ anions, and otherwise anions of aromatic sulfoic acids which may be optionally be substituted with alkyl groups. Particularly advantgeous are benzenesulfonate anions and chelate anions. As extremely desirable compounds, there may be employed aromatic compounds having acidic groups which are further substituted with nitro groups. The electroconductive salts containing these acidic nitroaromatic compounds as the base correspond to, for example, salts of nitrophenol, nitro-substituted aromatic carboxylic acid and nitro-substituted aromatic sulfonic acids. Particularly, it is advantageous to use nitro-, dinitro-and tri-nitrophenol, nitro-, dinitro- and trinitro-benzoic acid, and nitro-, dinitro- and trinitro-benzenesulfonic acid.

The electroconductive salt concentration in preparation of the electrode material of the present invention is generally 0.001 to 1 mol, advantageously 0.01 to 0.1 mol, per one liter.

As the cathode material for reducing saccharides, any desired one of all known electrode materials can be used as a general rule. Particularly, a metal such as platinum, molybdenum, tungsten or stainless steel, advantageously nickel or titanium, may be employed. It is also possible to use an electroconductive material of carbon or other organic materials.

Also, if necessary, the electrolytically reduced product obtained can be subjected to redoping again by applying current in an electrolyte solution in which the desired dopant co-exists.

The electrode material of the present invention can be used for the anode and/or the cathode to constitute primary and secondary batteries together with an electrolyte.

As the electrolyte, there may be employed electrolytes generally known in the art, including tetraalkylammonum salts (as counter ions of anions, perchlorate ions, phosphorus hexafluoride ions, thallium hexafluoride ions, arsenic hexafluoride ions, antimony hexafluoride ions, halide ions, nitrate ions, sulfate ions, rhenium tetroxide ions, etc.), alkali metal salts, alkaline earth metal salts (as counter ions of anions, those as enmuerated above), transition metals, rare earth elements, halides of noble metals, perchlorates, nitrates, etc.

As the solvent, there may be used those generally known to be used for batteries such as water, dimethyl sulfoxide, acetonitrile, propylene carbonate, 4-butyrolactone, formamide, tetrahydrofuran, 1,2-dimethoxyethane, etc.

When the electrode material of the present invention is used as the negative electrode, a metal chalcogenide compound such as $V_2O_5$, $TiS_2$, $MoS_2$, etc.; a carbonaceous material such as graphite, active carbon fiber, etc.; or an electroconductive polymer such as polyacetylene, poly-p-phenylene, polythiophene, polypyrrole, polyaniline, etc. can be used as the counter-electrode.

On the other hand, when the electrode material of the present invention is used as the positive electrode, a metallic single substance such as metal lithium, etc. or a carbonaceous material, etc. can be used as the counter-electrode.

When charging operation is conducted by applying a constant voltage across the both electrodes of the battery with a constitution as described above from an external power source or by regulating the voltage so that a constant current may be passed, anions are doped in the positive electrode and cations in the negative electrode to make them respectively the p-type electrode and the n-type electrode, and the electromotive force generated between the both electrodes can be utilized for the battery. During charging, the respective electrolyte ions are dedoped from the respective electrodes, whereby current can be taken out. By repeating cycles of such charging and discharging, it can be used as the secondary battery.

The battery having a constitution as described above has various advantages that it is excellent in stability, high in electromotive force and great in the maximum output density and energy density, and capable of taking various electrode forms.

Otherwise, the electrode material of the present invention is useful also for electronic and electrical materials such as solar battery, sensor, capacitor, electroconductive materials, etc., thus having very wide scope uses of the present invention.

The electrode material concerned with the present invention may be used in various forms as the electrode of the electrolytically reduced product of cellulose alone or in the form admixed with electroconductive materials such as carbon fibers, reinforcing materials, carriers, etc. As the electrode, it is useful not only as electrodes for secondary batteries but also as electrodes for solar battery, various sensors, elements, etc.

The carrier to be used in the present invention may be an electroconductive or insulating material, and it can be selected from the group consisting of fibers, mass of fibers such as woven fabrics, unwoven fabrics, felt, mesh, chips, etc. and moldings such as thin films, thick films, blocks, etc. which can stand carbonization temperature. The molding may be selected preferably from the group consisting of porous moldings, more preferably the group consisting of moldings having continuous pores.

As the electroconductive material, various kinds of carbon materials, metal materials, electroconductive ceramics, etc. may be employed. As the insulating material, ceramics such as $Al_2O_3$, $SiO_2$, etc., glass materials such as borosilicate glasses, silicate glasses, etc. may be employed.

The present invention is described more specifically by referring to the following Examples.

Example 1

(1) Electrolytic reduction of cellulose:

In 50 ml of an electrolyte solution prepared by mixing 0.9 mol of lithium perchlorate, 450 ml of propylene carbonate and 550 ml of methylmonoglyme, a nickel plate of 2 cm length and 1 cm width as an anode and a nickel plate (2 cm×1 cm) coated uniformly with 100 mg of cellulose powder (for thin chromatography, produced by Merck Co.) on one surface as a cathode were dipped so as to cofront each other with the cellulose being on the innerside with a glass fiber filter paper with a thickness of 0.5 mm interposed therebetween. By passing current at a current density of 5 mA for 3 hours, a black reduced product of cellulose was formed on the cathode. The potential difference between the both electrodes after completion of current passage was 5.0 V.

Then, short circuit of the both electrodes was effected at a current density of $1.25$ mA/cm$^2$ until the potential difference became 0.1 V.

(2) Battery by use of the electrolytically reduced product as a negative electrode and a nickel plate as a positive electrode:

The above electrolytically reduced product of cellulose formed on the nickel plate was taken out and this was used as the negative electrode, and a newly prepared nickel plate of 2 cm×1 cm as the positive electrode. Both electrodes were dipped in 50 ml of an electrolyte solution prepared by mixing 0.9 mol of lithium perchlorate, 0.04 mol of iodine, 450 ml of propylene carbonate and 550 ml of methylmonoglyme so as to confront each other with a glass fiber filter paper with a thickness of 0.5 mm interposed therebetween. Between the both electrodes, a platinum wire was connected as the lead wire. To the cathode of a potentiostat/galvanostat (HA-501 produced by Hokuto Denko Co.) was connected the nickel electrode carrying the above electrolytically reduced product of cellulose and to the positive electrode was connected the above nickel electrode, and charging was effected by passing a constant current of 0.2 mA/cm$^2$ for 30 minutes between the both electrodes.

After the above charging, the closed circuit voltage was measured to be 3.2 V. Also, immediately after the above charging, discharging was practiced at a constant current density of 0.2 mA/cm$^2$ for 30 minutes. The closed circuit voltages immediately after initiation of discharging and after practicing discharging for 30 minutes were measured to be 3.1 V and 3.0 V, respectively.

The above charging and discharging operations were practiced repeatedly, and the closed circuit voltages after the 10th charging, immediately after initiation of discharging and after discharging for 30 minutes were found to be 3.2 V, 3.1 V and 3.0 V, respectively. After the 11th charging, the battery was left to stand for 15 hours and thereafter discharging was practiced at a current density of 0.2 mA/cm$^2$ for 30 minutes, whereby the closed circuit voltage was found to be 2.8 V.

EXAMPLE 2

(1) Synthesis of (3,6-carbazolediyl):

In 50 ml of an electrolyte solution prepared by mixing 0.9 mol of lithium perchlorate, 450 ml of propylene carbonate and 550 ml of glyme, 0.01 mol of carbazole was dissolved.

Into this solution, each one sheet of a nickel plate of 2 cm × 1 cm was dipped as the anode and cathode plate, respectively. By passing current at a current density of 5 mA/cm$^2$ for 1.5 hours, a poly(3,6-carbazole-diyl) was formed on the anode. The potential difference between the both electrodes on completion of current passage was 4.1 V.

Then, short circuit of the both electrodes was effected at a current density of 5 mA/cm$^2$ until the potential difference became 0.1 V.

(2) Battery by use of the electrolytically reduced product as the negative electrode and the poly(3,6-carbazolediyl) as the positive electrode:

The negative electrode of the electrolytically reduced product cellulose formed on the nickel plate in Example 1 and the positive electrode of the poly(3,6-carbazolediyl) formed on the nickel plate were dipped in 50 ml of an electrolyte solution prepared by mixing 0.9 mol of lithium perchlorate, 0.04 mol of iodine, 450 ml of propylene carbonate and 550 ml of methylmonoglyme so as to confront each other with a 0.5 mm thick glass fiber filter paper interposed therebetween. Between the both electrodes, a platinum wire was connected as the lead wire. To the cathode of a potentiostat/galvanostat was connected the nickel plate carrying the above electrolytically reduced product of cellulose and to its anode the above nickel electrode, and a constant current of 0.2 mA/cm$^2$ was charged between the both electrodes for 30 minutes.

The closed circuit voltage of the battery after the above charging was measured to be 3.1 V. Also, immediately after the above charging, discharging was practiced at a constant current density of 0.2 mA/cm$^2$ for 30 minutes. The closed circuit voltage immediately after initiation of discharging was 2.9 V, and that after discharging for 30 minutes 2.8 V.

The above charging and discharging operations were practiced repeatedly, and the closed circuit voltages after the 10th charging, immediately after initiation of discharging and after discharging for 30 minutes were found to be 3.2 V, 3.0 V and 2.9 V, respectively. After the 11th charging, the battery was left to stand for 15 hours and thereafter discharging was practiced at a current density of 0.2 mA/cm$^2$ for 30 minutes, whereby the closed circuit voltage immediately after initiation of discharging and that after discharging for 30 minutes were found to be 3.0 V and 2.8 V, respectively.

EXAMPLE 3

Battery by use of the electrolytically reduced product as the positive electrode and lithium metal as the negative electrode:

The positive electrode of the electrolytically reduced product of cellulose formed on the nickel plate in Example 1 and the negative electrode of lithium metal were dipped in 50 ml of an electrolyte solution prepared by mixing 0.9 mol of lithium perchlorate, 0.04 mol of iodine, 450 ml of propylene carbonate and 550 ml of methylmonoglyme so as to confront each other with a 0.5 mm thick glass fiber filter paper interposed therebetween. Between the both electrodes, a platinum wire was connected as the lead wire. To the anode of a potentiostat/galvanostat was connected the nickel plate carrying the above electrolytically reduced product of cellulose and to its cathode the lithium metal, and a constant current of 0.2 mA/cm$^2$ was charged between the both electrodes for 30 minutes.

The closed circuit voltage of the battery after the above charging was measured to be 3.0 V. Also, immediately after the above charging, discharging was practiced at a constant current density of 0.2 mA/cm$^2$ for 30 minutes. The closed circuit voltage immediately after initiation of discharging was 2.9 V, and that after discharging for 30 minutes 2.8 V.

The above charging and discharging operations were practiced repeatedly, and the closed circuit voltages after the 10th charging, immediately after initiation of discharging and after discharging for 30 minutes were found to be 3.6 V, 2.9 V and 2.6 V, respectively. After the 11th charging, the battery was left to stand for 15 hours and thereafter discharging was practiced at a current density of 0.2 mA/cm$^2$ for 30 minutes, whereby the closed circuit voltage immediately after initiation of discharging and that after discharging for 30 minutes were found to be 2.9 V and 2.2 V, respectively.

We claim:

1. In a secondary battery of the type having two electrodes and an electrolyte into which the electrodes are inserted, a first of said electrodes being a negative electrode, a second of said electrodes being a positive electrode, the improvement wherein said first electrode consists essentially of an electrode support carrying an electrolytically reduced product obtained by electrolytic reduction of a saccharide alone, or said product admixed with an electroconductive material.

2. The battery of claim 1, wherein the saccharide is a polysaccharide.

3. The battery of claim 2, wherein the saccharide is a cellulose or a hemicellulose.

4. The battery of claim 3, wherein the saccharide is a cellulose.

5. The battery of claim 1, wherein said second electrode comprises at least one member selected from the group consisting of a metal chalcogenide compound, a carbonaceous material and an electroconductive polymer.

6. The battery of claim 1 wherein said electrolyte contains lithium ions.

7. The battery of claim 6 wherein said second electrode consists essentially of an electrode support carrying an electrolytically reduced product obtained by electrolytic reduction of a saccharide or said product admixed with an electroconductive material.

8. The battery of claim 1 wherein the saccharide is a monosaccharide, disaccharide or trisaccharide.

9. The battery of claim 1 wherein said electrode support is an electroconductive or an insulating carrier.

10. In a secondary battery having first and second electrodes and an electrolyte into which the electrodes are inserted, said first electrode being a negative electrode, said second electrode being positive electrode, the improvement wherein said first electrode comprises an electrode support carrying an electrolytically reduced product obtained by subjecting the negative electrode support to cathode reduction in an electrolyte solution containing saccharide to deposit the saccharide on the negative electrode support and form the negative electrode; said battery being charged by doping cations to the negative electrode and discharged by dedoping cations from the negative electrode.

11. The battery of claim 10 wherein said cations are lithium ions.